United States Patent
Kim et al.

(10) Patent No.: US 9,242,649 B2
(45) Date of Patent: Jan. 26, 2016

(54) VEHICLE CONTROL SYSTEM

(75) Inventors: Jonggap Kim, Hadano (JP); Shoichi Shono, Miyoshi (JP); Yoshikazu Motozono, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/408,405

(22) PCT Filed: Jun. 20, 2012

(86) PCT No.: PCT/JP2012/065697
§ 371 (c)(1),
(2), (4) Date: Dec. 16, 2014

(87) PCT Pub. No.: WO2013/190651
PCT Pub. Date: Dec. 27, 2013

(65) Prior Publication Data
US 2015/0151760 A1    Jun. 4, 2015

(51) Int. Cl.
*B60W 30/18*    (2012.01)
*F16D 48/06*    (2006.01)
(Continued)

(52) U.S. Cl.
CPC ......... *B60W 30/18072* (2013.01); *B60W 10/02* (2013.01); *B60W 10/06* (2013.01); *F16D 48/06* (2013.01); *B60W 2030/1809* (2013.01);
(Continued)

(58) Field of Classification Search
CPC .............................................. B60W 30/18072
See application file for complete search history.

(56) References Cited
U.S. PATENT DOCUMENTS

2004/0018913 A1* 1/2004 Okamoto ............. F16H 61/143
477/62

2004/0058779 A1* 3/2004 Ayabe ................. B60W 10/115
477/121
2013/0261910 A1* 10/2013 Ichikawa ............. F16H 61/0021
701/58

FOREIGN PATENT DOCUMENTS

JP    01-202538 A    8/1989
JP    05-077662 A    3/1993
(Continued)

OTHER PUBLICATIONS

International Search Report issued Aug. 14, 2012 in PCT/JP2012/065697 filed Jun. 20, 2012.

*Primary Examiner* — Tisha Lewis
(74) *Attorney, Agent, or Firm* — Oblon, McClelland, Maier & Neustadt, L.L.P.

(57) ABSTRACT

A vehicle control system is provided. The vehicle control system is applied to a vehicle having a clutch device to selectively connect and disconnect a power transmission route between a prime mover and drive wheels, and configured to disconnect the power transmission route during running to allow the vehicle to coast. The vehicle control system is comprised of: a vehicle speed detection means; an execution means that executes a coasting control when an operating amount of an accelerator is reduced to be smaller than a predetermined value during running, by bringing the clutch device into disengagement to disconnect the power transmission route so as to allow the vehicle to coast; an updating means that updates a lowest speed of the vehicle during execution of the coasting control; and a termination means that terminates the coasting control by bringing the clutch device into engagement to connect the power transmission route, when a difference between a current vehicle speed and the latest lowest vehicle speed exceeds a predetermined value.

4 Claims, 5 Drawing Sheets

(51) Int. Cl.
*B60W 10/02* (2006.01)
*B60W 10/06* (2006.01)
(52) U.S. Cl.
CPC . *F16D2500/1107* (2013.01); *F16D 2500/3108* (2013.01); *F16D 2500/3127* (2013.01); *F16D 2500/3144* (2013.01); *F16D 2500/3161* (2013.01)

(56) References Cited

FOREIGN PATENT DOCUMENTS

| | | |
|---|---|---|
| JP | 11-032404 A | 2/1999 |
| JP | 2008-024010 A | 2/2008 |
| JP | 2010-247773 A | 11/2010 |

\* cited by examiner

VEHICLE CONTROL SYSTEM

TECHNICAL FIELD

The present invention relates to a control system for a vehicle that is provided with a clutch device for selectively connect and disconnect a prime mover to/from drive wheels through a power transmission route, and that is allowed to coast by bringing the clutch device into disengagement.

BACKGROUND ART

In order to improve fuel economy, a fuel cut-off control for stopping fuel supply to an engine during running, and a coasting control for coasting the vehicle by disconnecting the engine from a drive line during running have been employed in recent years. Specifically, the fuel cut-off is carried out to stop fuel supply to the engine given that an accelerator is returned to close an accelerator valve completely, and that an engine speed is higher than an idling speed so that a vehicle speed is higher than a predetermined speed. Under the fuel cut-off control, although the combustion of fuel in the engine is stopped, the engine is still rotating by a torque from the drive wheels. Therefore, a braking torque resulting from a pumping loss of the engine and a friction torque is applied to the drive wheels. Consequently, an engine braking force is applied to the vehicle.

For example, the coasting control is carried out when the accelerator is returned during running to coast the vehicle without rotating the engine passively by bringing the clutch into disengagement disposed between the engine and the drive wheels. Therefore, under the coasting control, the engine braking force will not be applied to the vehicle so that the vehicle is allowed to coast utilizing an inertia energy.

The coasting control may be carried out not only by stopping the fuel supply to the engine but also without stopping the fuel supply to the engine while lowering the engine speed close to the idling speed. In case of carrying out the coasting control while stopping the engine, the fuel will not be consumed during coasting the vehicle so that the fuel economy can be improved significantly. By contrast, in case of carrying out the coasting control without stopping the engine, the fuel economy will not be improved as the case of stopping the engine. In this case, however, it is not necessary to arrange additional devices for insuring a required oil pressure under cessation of the engine such as an electric oil pump, a hydraulic accumulator etc. Therefore, the coasting control can be carried out easily without requiring additional modification of the vehicle and additional equipment. In the following explanation, the coasting control without stopping the engine will be called the "neutral coasting control" or the "N coasting control".

For example, Japanese Patent Laid-Open No. 2010-24773 describes a control for the neutral coasting. The coasting controller taught by Japanese Patent Laid-Open No. 2010-24773 is configured to bring the clutch disposed between the engine and the driving wheels into disengagement when the engine is not involved in propelling the vehicle, and to allow the vehicle by idling the engine. Specifically, the coasting controller is configured to commence the coasting control upon satisfaction of a starting condition based on an accelerator opening and a speed of a driven side of the clutch, and to terminate the coasting control upon satisfaction of a terminating condition based on the accelerator opening and the speed of a driven side of the clutch. In addition, the coasting controller is further configured to terminate the coasting control regardless of a satisfaction of the terminating condition if a difference between the vehicle speed at the commencement of the coasting control and the current vehicle speed exceeds a predetermined threshold value during execution of the coasting control.

Japanese Patent Laid-Open No. 2008-24010 describes a control device for hybrid vehicle configured to control a drive force and a regenerative braking force applied to the drive wheels from a motor-generator so as to achieve a target vehicle speed. According to the teachings of Japanese Patent Laid-Open No. 2008-24010, a limit value of the regenerative braking force of the motor-generator is determined on the basis of a deviation between the target vehicle speed and the current vehicle speed.

Japanese Patent Laid-Open No. 11-32404 describes a control equipment applied to an electric vehicle in which a regenerative braking force similar to an engine braking is established under the condition where both accelerator pedal and brake pedal are returned. According the teachings of Japanese Patent Laid-Open No. 11-32404, the regenerative braking force is changed in a manner such that an actual deceleration caused by the regenerative braking force is changed to achieve a target deceleration.

As described, the coasting controller taught by Japanese Patent Laid-Open No. 2010-24773 is configured to terminate the coasting control regardless of a satisfaction of the normal terminating condition if the vehicle speed is changed from that at the commencement of the coasting control and exceeds a predetermined threshold value during execution of the coasting control. Thus, according to the teachings of Japanese Patent Laid-Open No. 2010-24773, the coasting control can be terminated before the vehicle speed is changed to a certain extent during execution of the coasting control. Therefore, even if the vehicle speed is changed by a change in a road gradient, the vehicle speed will not be increased or decreased while coasting to exceed the threshold value so that a delay in acceleration and deceleration of the vehicle can be prevented.

However, if a timing to terminate the coasting control is determined based on a change in the vehicle speed from that at the commencement of the coasting control as taught by Japanese Patent Laid-Open No. 2010-24773, the coasting control may not be terminated at an appropriate timing. For example, if the coasting control is commenced when the vehicle runs on a flat road or climbs a gentle slope and then the vehicle runs down a steep slope, the vehicle is decelerated gently in the beginning and then accelerated significantly. That is, if the change in the deceleration of the vehicle does not exceed the threshold value in the beginning of the coasting control, the change in the vehicle speed will not be calculated until a point when the vehicle speed once decelerated in the beginning of the coasting control is raised again to the speed at the commencement of the coasting control, and the coasting control is continued until the change in the vehicle speed exceeds the threshold value. That is, a change in the vehicle speed increased from the lowest speed during deceleration is a net change in the vehicle speed of this case.

Thus, according to the coasting control taught by Japanese Patent Laid-Open No. 2010-24773, a net change in the increasing vehicle speed may be increased. Therefore, even if the acceleration felt by a driver or a passenger is increased by such increment in the net change in the increasing vehicle speed, the coasting control would be continued without applying a braking force to the vehicle for long period of time. For this reason, the driver and a passenger(s) may feel uncomfortable feeling or fear.

DISCLOSURE OF THE INVENTION

The present invention has been conceived noting the foregoing technical problem, and it is therefore an object of the present invention is to provide a vehicle control system for carrying out the coasting control of a vehicle by interrupting a power transmission between a prime mover and drive wheels, without making a driver and a passenger(s) feel discomfort or fear.

The vehicle control system of the present invention is applied to a vehicle having a clutch device adapted to selectively connect and disconnect a power transmission route between a prime mover and drive wheels, and configured to disconnect the power transmission route during running to allow the vehicle to coast. In order to achieve the above-mentioned objective, the vehicle control system is provided with: a detection means that detects a vehicle speed; an execution means that executes a coasting control when an operating amount of an accelerator is reduced to be smaller than a predetermined value during running, by bringing the clutch device into disengagement to disconnect the power transmission route so as to allow the vehicle to coast; an updating means that updates the vehicle speed to the lowest vehicle speed during execution of the coasting control; and a termination means that terminates the coasting control by bringing the clutch device into engagement to connect the power transmission route, when a difference between a current vehicle speed and the latest lowest vehicle speed exceeds a predetermined value.

According to the present invention, the vehicle control system is provided with a means that detects a road grade, and the execution means may be configured to execute the coasting control if the operating amount of the accelerator is reduced to be smaller than the predetermined value during running, and the road grade falls within a predetermined range across 0%.

The execution means may also be configured to execute the coasting control if the operating amount of the accelerator is reduced to be smaller than the predetermined value during running, and the vehicle runs at a speed higher than a predetermined speed. The termination means may also be configured to terminate the coasting control when the vehicle speed is reduced to be lower than the predetermined speed.

An engine for generating power by burning fuel may be used as the prime mover, and the vehicle control system is further provided with an engine speed detection means. The execution means may also be configured to execute the coasting control if the operating amount of the accelerator is reduced to be smaller than the predetermined value during running and the engine is combusted, and to control the engine during execution of the coasting control in a manner such that the engine speed is reduced to an idling speed that is lower than that of the case in which the vehicle runs without carrying out the coasting control.

Thus, according to the present invention, the clutch device is brought into disengagement to disconnect the power transmission route between the prime mover and the drive wheels. That is, the coasting control is executed to allow the vehicle to coast. Consequently, a cruising distance of the vehicle can be extended without applying a load to the prime mover so that the energy efficiency of the vehicle can be improved. During execution of the coasting control, a lowest value of the detected vehicle speed (i.e., the lowest vehicle speed) is continually updated, and the coasting control is terminated by bringing the clutch device into engagement. As a result, the prime mover is connected to the drive wheels through the power transmission route and a braking torque derived from a load and resistance acting on the power transmission route is applied to the drive wheels. Therefore, the vehicle speed increased from the lowest speed during execution of the coasting control can be reduced. For example, if a road grade changes to a steeper downgrade and the speed of the coasting vehicle is therefore increased, the coasting control is terminated to reduce the vehicle speed by applying a braking force to the vehicle. Therefore, even if the running condition is thus changed to increase the vehicle speed during execution of the neutral coasting control, the coasting control can be carried out and terminated properly in order not to make a driver and a passenger(s) feel discomfort or fear.

According to the present invention, the coasting control may be executed and terminated taking account of the road grade. For example, the coasting control is allowed to be carried out if the vehicle runs on a flat road where the gradient is 0%, or on a road where the upgrade or downgrade falls within an allowable range. By contrast, the coasting control is inhibited if the vehicle runs on a steep upslope or downslope that significantly affects the running load. Thus, the coasting control can be executed depending on a situation.

According to the present invention, the coasting control may also be executed and terminated taking account of the vehicle speed. For example, the coasting control is allowed to be carried out if the vehicle speed is higher than a predetermined speed where the coasting control is effective, and the coasting control is inhibited if the vehicle speed is lower than a predetermined speed where the coasting control is not effective. Thus, the coasting control can be appropriately executed and terminated depending on a situation.

In addition, given that the control system pf the present invention is applied to a vehicle in which the engine is used as the prime mover, the coasting control can be carried out taking account of an operating condition of the engine such as an engine speed. That is, the coasting control can be carried out while combusting the engine, and in this case, the engine speed is kept to the idling speed during the execution of the coasting control. Therefore, the coasting control can be carried out effectively to improve fuel economy.

DESCRIPTION OF THE PREFERRED EMBODIMENT(S)

Figure 1:
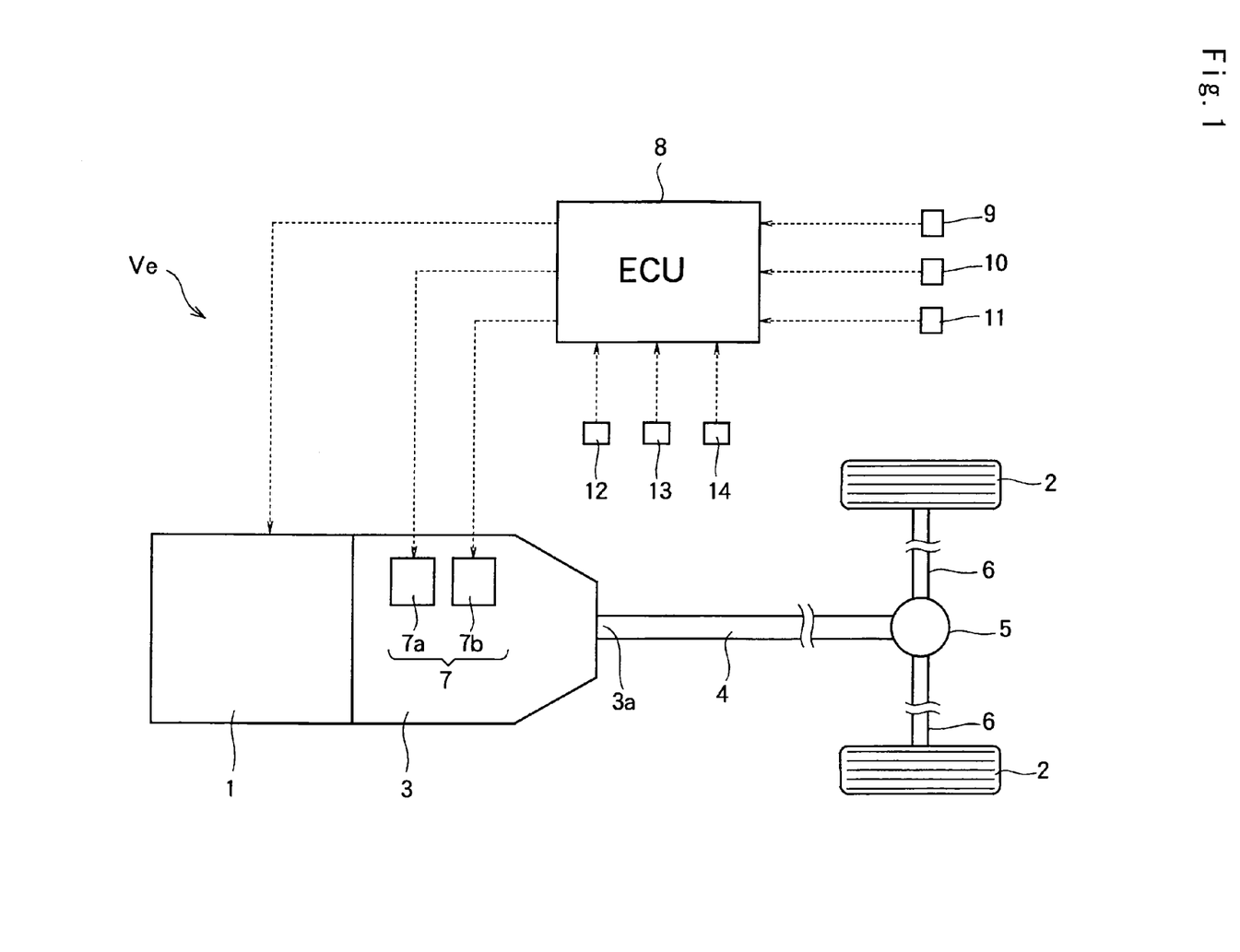
FIG. 1 is a view schematically showing an example of a drive line and a control line of the vehicle to which the control system of the present invention is applied.

Next, the present invention will be explained in more detail with reference to the accompanying drawings. FIG. 1 shows a drive line and a control line of the vehicle to which the control system of the present invention is applied. As shown in FIG. 1, the vehicle Ve is comprised of an engine 1, and an automatic transmission 3 connected to an output side of the engine 1 to transmit a power of the engine 1 to drive wheels 2. Specifically, the automatic transmission 3 is disposed on the output side of the engine 1, and an output shaft 3a of the automatic transmission 3 is connected to the drive wheels 2 to transmit power therebetween through a propeller shaft 4, a differential gear 5 and a drive shaft 6. Thus, FIG. 1 shows an example of rear-drive layout of the vehicle Ve in which the engine 1 is connected to the rear drive wheels 2 through the propeller shaft 4. However, the control system of the present invention may also be applied to a front drive vehicle and a four-wheel drive vehicle.

The engine 1 serves as a prime mover of the present invention, and for example, an internal combustion engine for generating a power by burning fuel such as a gasoline engine, a diesel engine a natural gas engine and etc. may be used. According to the example shown in FIG. 1, the gasoline engine is used as the engine 1, and the engine 1 is comprised of an electronic throttle valve an opening degree thereof is controlled electrically, and a fuel injector an injecting amount thereof is controlled electrically. Therefore, the engine 1 can be operated in an optimally fuel efficient manner by electrically controlling a rotational speed with respect to a predetermined load.

The automatic transmission 3 is adapted to transmit a torque of the engine 1 to the drive wheels 2 while carrying out a speed change. For example, a geared automatic transmission (AT), a belt-driven or toroidal continuously variable transmission (CVT), a dual-clutch automatic transmission (DCT) based on a geared manual transmission, an automatic clutch manual transmission (AMT) and so on may be used as the automatic transmission 3. The vehicle Ve is further provided with a clutch device 7 adapted to selectively allow a power transmission between the engine 1 and the drive wheels 2, irrespective of a type of the automatic transmission 3, and irrespective of a drive system such as a front drive system, a rear drive system and a four wheel drive system.

According to the example shown in FIG. 1, a geared automatic transmission having a planetary gear unit is employed as the automatic transmission 3. As the conventional AT, the automatic transmission 3 is comprised of a plurality of planetary gear units (not shown), a forward clutch 7a engaged to establish a forward stage, and a reverse brake 7b engaged to establish a reverse stage. Optionally, the automatic transmission 3 may be provided with an additional clutch or brake to be engaged to establish a predetermined forward stage. Accordingly, the automatic transmission 3 is brought into a neutral stage by disengaging both of the forward clutch 7a and the reverse brake 7b. As a result of thus disengaging the forward clutch 7a and the reverse brake 7b, the engine 1 is disconnected from the drive wheels 2 so that the power transmission therebetween is interrupted. Accordingly, in the example shown in FIG. 1, the clutch device 7 comprised of the forward clutch 7a and the reverse brake 7b serves as the clutch device of the invention.

As described, the CVT may be used as the automatic transmission 3. The conventional CVT is comprised of a belt driven transmission and a torque reversing device for reversing a direction of the torque transmitted to the drive wheels 2 between the forward direction and the backward direction. Specifically, the torque reversing device is comprised of a forward clutch engaged to establish the forward stage and a reverse clutch engaged to establish the reverse stage. Therefore, the power transmission between the engine 1 and the automatic transmission 3 is interrupted by disengaging both of the forward clutch and the reverse brake. That is, a neutral stage of the automatic transmission 3 is established. In this case, the forward clutch and the reverse brake serve as the clutch device of the invention.

Given that the DCT is used as the automatic transmission 3, the power transmission between the engine 1 and the automatic transmission 3 is interrupted by disengaging both of the clutches of the DCT. That is, a neutral stage of the automatic transmission 3 is established. In this case, the two clutches of the DCT serve as the clutch device of the invention.

Given that the AMT is used as the automatic transmission 3, the power transmission between the engine 1 and the automatic transmission 3 is interrupted by disengaging a clutch of the conventional manual transmission device and the engine 1. That is, a neutral stage of the automatic transmission 3 is established. In this case, the above-explained clutch serves as the clutch device of the invention.

The control system of the present invention may be applied not only to a hybrid vehicle in which the prime mover is comprised of an internal combustion engine and an electric motor, but also to an electric vehicle in which only the electric motor is used as the prime mover. In order to selectively connect and disconnect the power transmission route between the prime mover and the drive wheels 2, according to the present invention, the vehicle Ve is provided with the clutch device 7 irrespective of a kind of the prime mover such as the engine 1, the electric motor, and a hybrid drive unit comprised of the engine 1 and the electric motor. For example, a friction clutch and a dog clutch may be used as the clutch device 7, and in case of using the friction clutch, any of a wet type and a dry type friction clutches may be used. That is, any kinds of clutch devices may be used as the clutch device 7 to selectively allow and interrupt a power transmission route between the prime mover such as the engine 1, the electric motor, and a hybrid drive unit and the drive wheels 2 to transmit power therebetween.

Given that the vehicle Ve is the hybrid vehicle or the electric vehicle having the electric motor as the prime mover, a braking force can be applied to the vehicle Ve by carrying out a regeneration control of the electric motor while engaging the clutch device 7. Specifically, a braking torque can be applied to the drive wheels 2 to decelerate the vehicle Ve during running by operating the electric motor as a generator while engaging the clutch device 7.

In order to control an operating condition of the engine 1 and engagement state of the clutch device 7, the vehicle Ve is provided with an electronic control unit (ECU) 8 as a controller that is configured to carry out a calculation based on input data and preinstalled data, and to output a calculation result in the form of a command signal. For example, detection signals from a wheel speed sensor 9 adapted to detect a rotational speed of each wheel of the vehicle Ve, an accelerator sensor 10 adapted to detect a depressing angle or a depressing amount of an accelerator pedal, a brake sensor 11 adapted to detect a depressing angle or a depressing amount of a brake pedal, an engine speed sensor 12 adapted to detect a speed of the engine 1, an acceleration sensor 13 adapted to detect acceleration of the vehicle Ve, an inclination sensor 14 adapted to detect an inclination angle of the vehicle Ve and so on are sent to the electronic control unit 8. Based on those signals, the electronic control unit 8 sends a command signals to the engine 1 to control the operating condition, and to the clutch device 7 to control the engagement state.

Given that the electric motor is used as the prime mover of the vehicle Ve, a detection signal from a speed sensor for the electric motor or a resolver is additionally sent to the electronic control unit 8. In this case, the electronic control unit 8 sends a command signal to the electric motor to control the operating condition.

In order to improve fuel economy of the vehicle Ve thus structured, the control system of the present invention carries out the neutral coasting control of the vehicle Ve by bringing the clutch device 7 into disengagement during running. According to the present invention, specifically, the neutral coasting control is carried out to cutoff a power transmission route between the engine 1 and the drive wheel 2 by disengaging the clutch device 7, under a condition that the accelerator pedal is not depressed, in other words, completely returned while the vehicle Ve is moving at a speed higher than a predetermined speed. Under the neutral coasting control, however, the engine 1 will not be stopped. That is, under the neutral coasting control, although the speed of the engine 1 is lowered almost to an idling speed, the fuel combustion is carried on.

Thus, under the neutral coasting control, a power transmission between the engine 1 and the drive wheel 2 is interrupted. Therefore, a braking torque resulting from a pumping loss of the engine 1 and a drag torque will not be applied to the drive wheels 2 of the vehicle Ve. In other words, an engine braking force will not be applied to the vehicle Ve. Therefore, under the neutral coasting, a possible coasting distance achieved by an inertia energy of the vehicle Ve is extended. Consequently, a cruising distance of the vehicle Ve per unit of fuel can be extended so that the fuel economy of the vehicle Ve can be improved.

Under the neutral coasting control, the fuel economy of the vehicle Ve can be further improved if the fuel combustion of the engine 1 is stopped while disengaging the clutch device 7. However, if the fuel combustion of the engine 1 is stopped, a power for actuating auxiliaries such as an oil pump and a compressor for an air conditioner, and a power for actuating a hydraulic power steering system and a brake system will be lost. In this case, therefore, a substitute power source (e.g., an electric motor) and a hydraulic accumulator are required for the case of cessation of the engine 1. By contrast, given that the engine 1 is not stopped under the neutral coasting control, the power for driving those auxiliaries and the power steering and the brake systems will not be lost. In this case, therefore, the neutral coasting control can be carried out easily in the conventional vehicles without requiring the additional power source.

Figure 2:
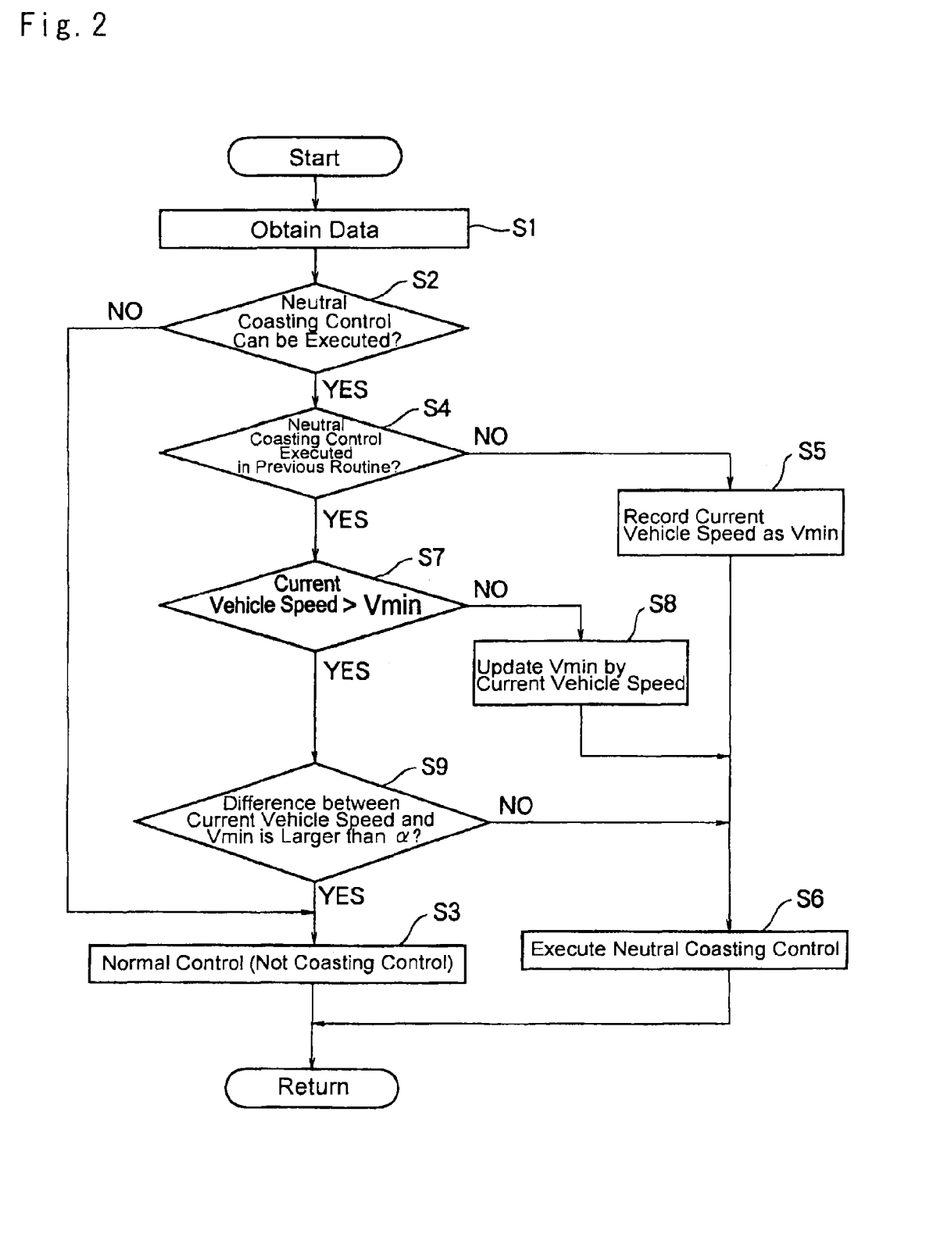
FIG. 2 is a flowchart showing one example of the neutral coasting control carried out by the control system of the present invention.

The control system of the present invention is configured to carry out the neutral coasting control without making a driver and a passenger(s) feel discomfort or fear, even if a road grade changes to a steeper downgrade and the speed of the coasting vehicle is therefore increased. An example of such control is shown in FIG. 2, and the routine shown therein is repeated at predetermined short intervals. First of all, data about a running condition and an operating condition of the vehicle Ve is obtained (at step S1). Specifically, a speed of the vehicle Ve is obtained based on a detection value of the wheel speed sensor 9, an operating amount of the accelerator is obtained based on a detection value of the accelerator sensor 10, an operating amount of the brake pedal is obtained based on a detection value of the brake sensor 11, a speed of the engine 1 is obtained based on a detection value of the engine speed sensor 12, and a road grade is obtained based on a detection value of the acceleration sensor 13 or the inclination sensor 14.

Figure 3:
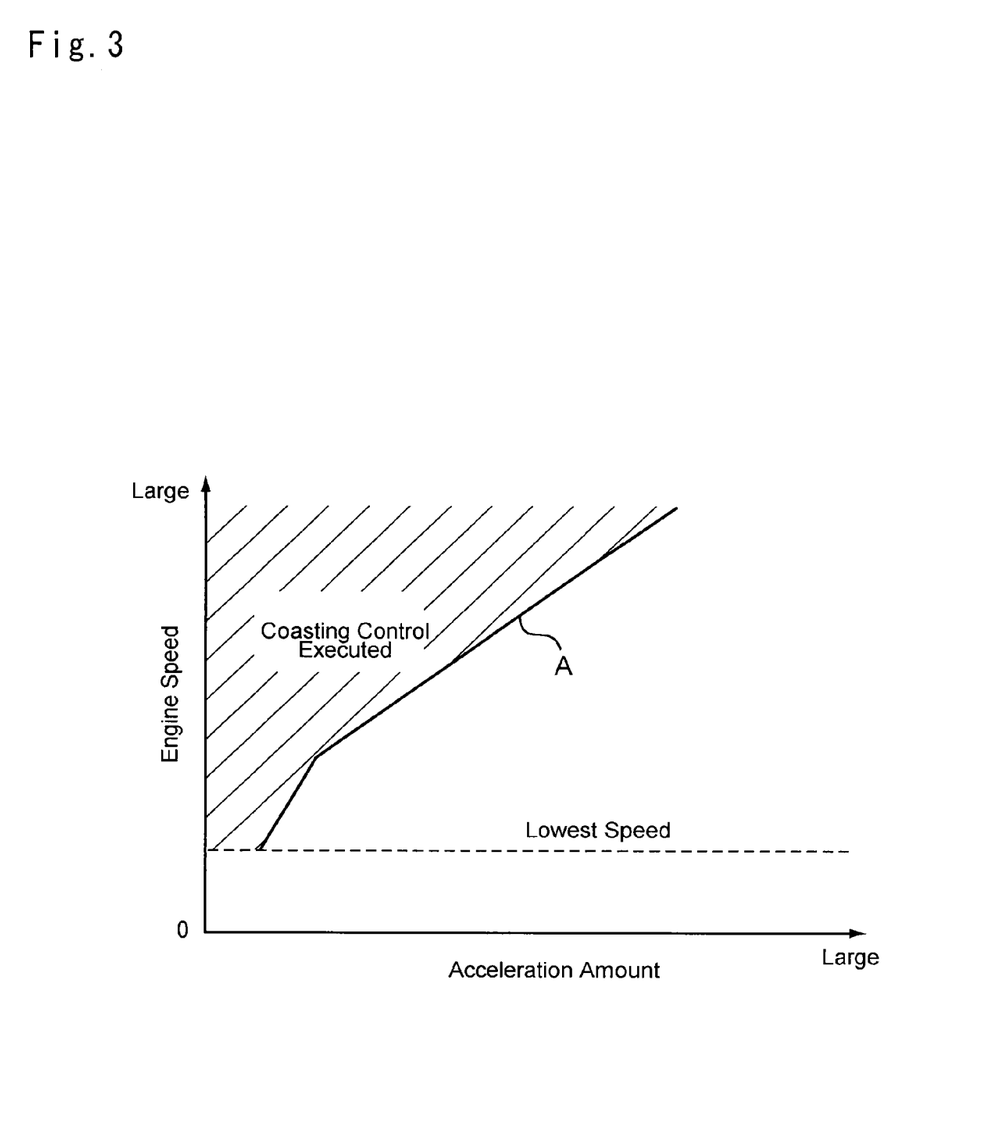
FIG. 3 shows one example of a map used in the coasting control according to the present invention.

Then, it is determined whether or not the neutral coasting control can be executed based on the data obtained at step S1 (at step S2). Specifically, it is determined whether or not an execution condition of the neutral coasting control is satisfied. According to the present invention, the neutral coasting control is triggered by the fact that the operating amount of the accelerator is reduced to zero or to be smaller than a predetermined value while the vehicle Ve is running at a speed higher than the predetermined speed. Specifically, the fact that the operating amount of the accelerator is reduced to zero or to be smaller than a predetermined value is a condition to determine whether or not the accelerator pedal depressed by the driver is released and returned. The reference value of the operating amount of the accelerator used to determine to execute the neutral coasting control is not necessarily to be zero. For example, as indicated in the map shown in FIG. 3, the neutral coasting control is commenced when the operating amount of the accelerator is reduced to be smaller than a reference value A. Optionally, as shown in FIG. 3, the reference value A may be altered in accordance with the engine speed Ne.

The abovementioned predetermined speed is a reference value of the vehicle speed used to determine to execute the neutral coasting control. To this end, a threshold value for judging a speed range where the neutral coasting control is effective is determined based on a simulation result or an experiment. Alternatively, given that the vehicle Ve has a torque converter, the threshold value is set e.g., to 15 to 20 km/h that is a speed of the vehicle Ve creeping on a flat road while idling the engine 1.

Optionally, a fact that a road grade on which the vehicle Ve is running falls within a predetermined range across 0%, and a fact that the engine 1 is combusted may be added to the execution condition of the neutral coasting control. Specifically, such range of the road grade is used as a reference range to determine if the road is a flat road where the gradient is 0%, or if an upgrade or a downgrade will not affect a running load and ignorable. To this end, such range of the road grade is determined based on a simulation result or an experiment, and may also be altered in accordance with the vehicle speed. For example, the range of the road grade is set to ±2% within the speed range lower than 40 km/h, and set to ±4% within the speed range higher than 40 km/h.

According to the control example shown in FIG. 2, an execution of the neutral coasting control is determined upon satisfaction of all of the above-mentioned execution conditions. Specifically, the neutral coasting control is allowed to be carried out under the condition that the vehicle Ve is propelled by a drive force of the engine 1, that the vehicle Ve is running on the road where the gradient thereof falls within the predetermined range at the speed higher than the predetermined speed, and that the operating amount of the accelerator is reduced to be smaller than the reference value A.

If at least any one of the above-mentioned execution conditions is not satisfied so that the answer of step S2 is NO, the routine advances to step S3 to continue the normal control without carrying out the neutral coasting control. In this case, for example, the fuel cut-off control may be carried out to temporarily stop the fuel supply to the engine 1. Otherwise, if the vehicle Ve is powered by the electric motor, a regeneration control is carried out by operating the electric motor as a generator to generate a regeneration torque. Thus, an engine braking force or a braking force derived from the regeneration torque of the electric motor is applied to the vehicle Ve in this case. Then the routine is returned.

By contrast, if all of the above-mentioned execution conditions to carry out the neutral coasting control are satisfied so that the answer of step S2 is YES, the routine advances to step S4 to determine whether or not the neutral coasting control has been commenced during the previous routine. If the neutral coasting control has been carried out neither just after the commencement of the current routine nor during the previous routine so that the answer of step S4 is NO, the routine advances to step S5 and the vehicle speed detected during the current routine is recorded as a lowest vehicle speed Vmin, and then, the neutral coasting control is carried out (at step S6). Specifically, the clutch device 7 is brought into disengagement to allow the vehicle Ve to coast. In this situation, the power transmission between the engine 1 and the drive wheels 2 is interrupted so that a load on the engine 1 is eliminated. In addition, the rotational speed of the engine 1 is lowered to the idling speed. Here, the definition of the "idling speed" is a speed lower than a speed range of the engine 1 under the normal running, and a lowest speed at which the engine 1 free from the load is allowed to rotate autonomously. Specifically, the definition of the "normal running" is a running condition of the vehicle Ve in which the clutch device 7 is in engagement to power the vehicle Ve by the engine 1. After commencing the neutral coasting control at step S6, the routine is returned.

If the neutral coasting control has been commenced during the previous routine so that the answer of step S4 is YES, the routine advances to step S7 to determine whether or not the current vehicle speed detected at the current routine is higher than the lowest vehicle speed Vmin recorded during the previous routine. If the current vehicle speed is lower than the lowest vehicle speed Vmin so that the answer of step S7 is NO, the routine advances to step S8 to update the lowest vehicle speed Vmin. That is, the current vehicle speed is recorded as the latest lowest vehicle speed Vmin. Then, the routine is returned.

By contrast, if the current vehicle speed is higher than the lowest vehicle speed Vmin so that the answer of step S7 is YES, the routine advances to step S9 to determine whether or not a difference between the current vehicle speed and the lowest vehicle speed Vmin is larger than a predetermined value $\alpha$. That is, it is determined whether or not an increase amount of the vehicle speed from the lowest vehicle speed Vmin updated during the execution of the neutral coasting control is larger than the predetermined value $\alpha$.

For example, if the vehicle speed is continuously increased or the speed increasing amount is larger than the normal condition during coasting of the vehicle Ve, the driver and a passenger(s) may feel uncomfortable feeling or fear. According to the present invention, therefore, the control system terminates the neutral coasting control if the increase amount of the vehicle speed from the lowest vehicle speed Vmin during execution of the neutral coasting control is excessive. That is, the vehicle speed is prevented from being raised by terminating the neutral coasting control to apply an engine braking force to the vehicle Ve. Therefore, in order to determine whether or not the driver and the passenger(s) feels uncomfortable feeling or fear caused by an increment of vehicle speed during execution of the neutral coasting control, a threshold value is determined based on an result of simulation or experiment. For example, an upper limit value of the increment of speed of the vehicle Ve that does not make the driver and the passenger(s) feel discomfort or fear during coasting is set to 5 to 10 km/h as the threshold value.

If the difference between the current vehicle speed and the lowest vehicle speed Vmin is smaller than the predetermined value $\alpha$ so that the answer of step S9 is NO, the routine advances to step S6 to execute the neutral coasting control. That is, the neutral coasting control being executed is continued. Then, the routine is returned.

By contrast, if the difference between the current vehicle speed and the lowest vehicle speed Vmin is larger than the predetermined value $\alpha$ so that the answer of step S9 is YES, the routine advances to step S3 to carry out the normal control instead of the neutral coasting control. That is, the neutral coasting control being executed is terminated. Specifically, the clutch device 7 that has been in disengagement under the neutral coasting control is brought into engagement to provide a power transmission between the engine 1 and the drive wheels 2. Consequently, the engine braking force is applied to the vehicle Ve so that the vehicle speed can be suppressed or lowered. Then, the routine is returned.

Figure 4:
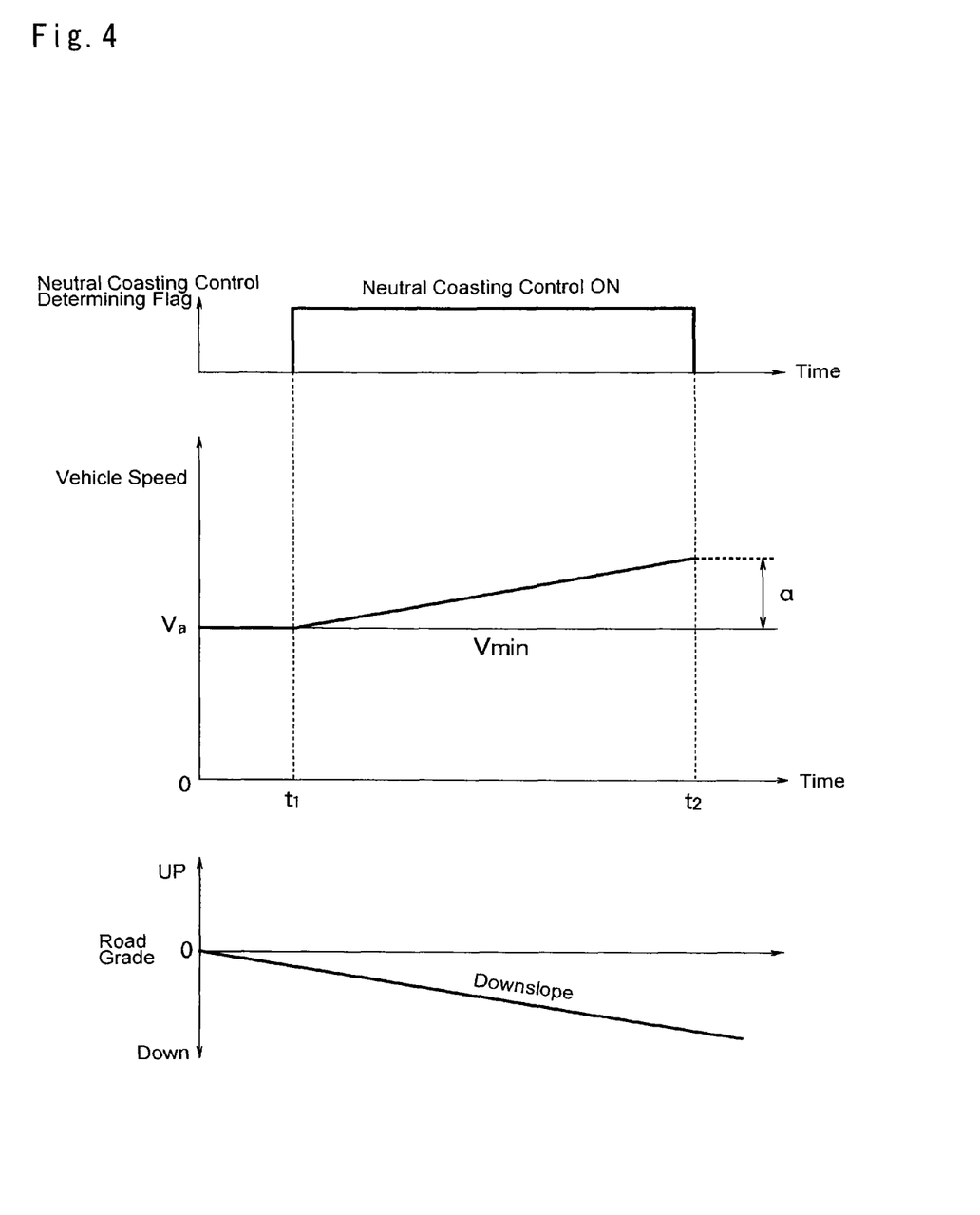
FIG. 4 is a time chart showing a change in a speed of the vehicle running down a slope under execution of the neutral coasting control of the present invention.
Figure 5:
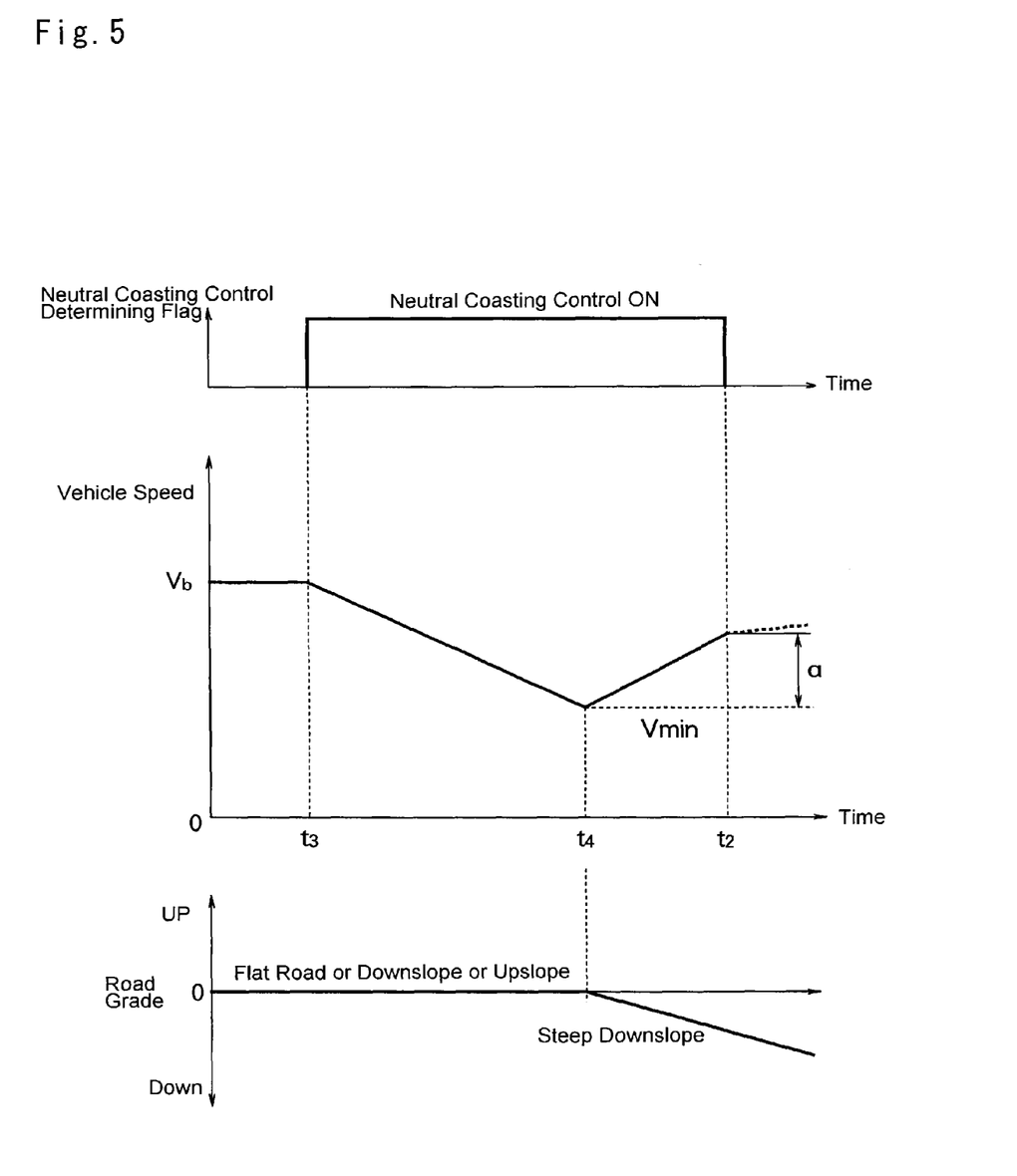
FIG. 5 is a time chart showing a change in a speed of the vehicle running on a flat road and then running down a slope under execution of the neutral coasting control of the present invention.

Referring now to FIGS. 4 and 5, there are shown a change in the vehicle speed during execution of the neutral coasting control. Specifically, FIG. 4 is a time chart indicating a change in the speed of the vehicle Ve running on a predetermined downgrade at a vehicle speed Va. The neutral coasting control is commenced at point t1 so that a coasting of the vehicle Ve is commenced from the point t1. In this situation, a force propelling the vehicle to run down the slope is greater than a running resistance of the vehicle Ve. Therefore, speed of the vehicle Ve thus running down the slope is being increased.

According to the present invention, the lowest speed value of the vehicle is continually updated during execution of the neutral coasting control. In the example shown in FIG. 4, the vehicle speed Va at the point t1 when the neutral coasting control was commenced is recorded as the lowest speed Vmin, and when an increasing amount of the vehicle Ve from the lowest speed Vmin exceeds the predetermined valur $\alpha$ at point t2, the neutral coasting control is terminated. In other words, the neutral coasting control is terminated when the increasing vehicle speed reaches "Vmin+$\alpha$" during execution of the neutral coasting control. An engine braking force is applied to the vehicle Ve upon termination of the neutral coasting control. Consequently, increment of the vehicle speed can be suppressed or the vehicle speed can be lowered.

If the speed of the vehicle coasting on a downslope under the neutral coasting control is continuously increased and a speed increasing amount is increased excessively, the driver and a passenger(s) may feel uncomfortable feeling or fear. However, according to the present invention, the neutral coasting control is terminated to apply an engine braking force to the vehicle Ve when the speed increasing amount of the vehicle from the lowest vehicle speed Vmin reaches the predetermined value $\alpha$ during execution of the neutral coasting control. Therefore, the vehicle speed will not be increased excessively during execution of the neutral coasting control so that the driver and a passenger(s) can be prevented from feeling uncomfortable feeling or fear.

FIG. 5 is a time chart indicating a change in the speed of the vehicle Ve running on a flat road, or on a road a within a predetermined downgrade or an upgrade under the neutral coasting control, and then the road grade changes to a steeper downgrade. In the example shown in FIG. 5, the vehicle Ve runs at a vehicle speed Vb, and the neutral coasting control is commenced at point t3 to start coasting of the vehicle Ve. In this situation, the vehicle Ve is propelled by the inertia energy but the vehicle speed is gradually lowered by a running resistance. Therefore, according to the example shown in FIG. 5, the lowest vehicle speed Vmin from the point t3 at which the neutral coasting control was started is updated continually.

Then, when the vehicle Ve reaches the steeper downslope at point t4, a gravitational force propelling the vehicle downwardly exceeds the running resistance of the vehicle Ve. That is, the vehicle Ve was decelerated until the point t4, and then runs down the downslope while being accelerated after the point t4. Therefore, the vehicle speed at the point t4 is recorded as the lowest vehicle speed Vmin.

Thereafter, when the speed increasing amount of the vehicle from the lowest vehicle speed Vmin exceeds the predetermined value $\alpha$ at the point t5, the neutral coasting control is terminated. In other words, the neutral coasting control is terminated when the increasing vehicle speed reaches "Vmin+$\alpha$" during execution of the neutral coasting control. An engine braking force is applied to the vehicle Ve upon termination of the neutral coasting control. Consequently, increment of the vehicle speed can be suppressed or the vehicle speed can be lowered.

As shown in FIG. 5, if the road grade changes to a steeper downgrade during execution of the neutral coasting control and the vehicle previously decelerated is therefore accelerated afterward, a net change in the vehicle speed from the lowest vehicle speed Vmin may be increased even if the speed of the vehicle is not increased from the initial vehicle speed Vb. Even if the vehicle speed is low, the driver and a passenger(s) may feel uncomfortable feeling or fear if the net change in the vehicle speed is thus increased. However, according to the present invention, the lowest vehicle speed Vmin is updated continually during execution of the neutral coasting control, and the neutral coasting control is terminated when the increasing amount of the vehicle from the lowest vehicle speed Vmin reaches the predetermined value α. Therefore, the neutral coasting control can be carried out without making a driver and a passenger(s) feel discomfort or fear, even if the net change in the vehicle speed is increased.

Thus, when the operating amount of the accelerator is reduced to be smaller than the reference value A, the vehicle control system of the present invention disengages the clutch device 7 to interrupt a power transmission between the engine 1 and the drive wheels 2 while keeping the speed of the engine 1 to the idling speed. That is, the neutral coasting control is carried out to allow the vehicle to coast. Consequently, a cruising distance of the vehicle Ve can be extended without applying a load to the engine 1 so that the fuel economy of the vehicle Ve can be improved.

In addition, the lowest detected vehicle speed Vmin is continually updated during execution of neutral coasting control, and when the difference between the current vehicle speed and the lowest vehicle speed Vmin, that is, the speed increasing amount of the vehicle from the lowest vehicle speed Vmin reaches the predetermined value α, the neutral coasting control is terminated by bringing the clutch device 7 into engagement. Consequently, the engine 1 is connected to the drive wheels 2 through the power transmission route, and a braking torque derived from a load and resistance acting on the power transmission route is applied to the drive wheels 2. Therefore, the vehicle speed increased to be higher than the predetermined value α during execution of the neutral coasting control can be reduced.

For example, even if the vehicle speed is not increased from the speed in the beginning of the neutral coasting control, the neutral coasting control will be terminated if the road grade gets steeper to increase the vehicle speed during the neutral coasting control. Consequently, a braking force is applied to the vehicle Ve to suppress increment of vehicle speed. Thus, even if the running condition is changed to increase the vehicle speed during execution of the neutral coasting control, the neutral coasting control can be carried out and terminated properly in order not to make a driver and a passenger(s) feel discomfort or fear.

Here will be briefly explained a relation between the above-explained example and the present invention. The functional means to carry out the controls of steps S2 to S9 serve as the "execution means" of the invention, the functional means to carry out the control of step S8 serves as the "updating means" of the invention, and the functional means to carry out the controls of steps S3 and S9 serve as the "termination means" of the invention.

The invention claimed is:

1. A vehicle control system, that is applied to a vehicle having a clutch device adapted to selectively connect and disconnect a power transmission route between a prime mover and drive wheels, and that is configured to disconnect the power transmission route during running to allow the vehicle to coast, comprising:
 a controller that is configured to:
 detect a vehicle speed;
 execute a coasting control when an operating amount of an accelerator is reduced to be smaller than a predetermined value during running, by bringing the clutch device into disengagement to disconnect the power transmission route so as to allow the vehicle to coast;
 update the vehicle speed to the lowest vehicle speed during execution of the coasting control; and
 terminate the coasting control by bringing the clutch device into engagement to connect the power transmission route, when a difference between a current vehicle speed and the latest lowest vehicle speed exceeds a predetermined value.

2. The vehicle control system as claimed in claim 1, wherein the controller is further configured to:
 detect a road grade; and
 execute the coasting control if the operating amount of the accelerator is reduced to be smaller than the predetermined value during running, and the road grade falls within a predetermined range across 0%.

3. The vehicle control system as claimed in claim 1, wherein the controller is further configured to:
 execute the coasting control if the operating amount of the accelerator is reduced to be smaller than the predetermined value during running, and the vehicle runs at a speed higher than a predetermined speed; and
 terminate the coasting control when the vehicle speed is reduced to be lower than the predetermined speed.

4. The vehicle control system as claimed in claim 1,
 wherein the prime mover includes an engine that generates power by burning fuel; and
 wherein the vehicle control system is further comprised of a means that detects a speed of the engine; and
 wherein the controller is further configured to execute the coasting control if the operating amount of the accelerator is reduced to be smaller than the predetermined value during running and the engine is combusted, and to control the engine during execution of the coasting control in a manner such that the engine speed is reduced to an idling speed that is lower than that of the case in which the vehicle runs without carrying out the coasting control.

* * * * *